(12) United States Patent
Payne

(10) Patent No.: US 11,198,359 B2
(45) Date of Patent: Dec. 14, 2021

(54) DUAL MOTOR COAXIAL E-AXLE WITH ROTOR SHAFT LOCKING MECHANISM

(71) Applicant: SCHAEFFLER TECHNOLOGIES AG & CO. KG, Herzogenaurach (DE)

(72) Inventor: Matthew Payne, Glenmont, OH (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 48 days.

(21) Appl. No.: 16/715,942

(22) Filed: Dec. 16, 2019

(65) Prior Publication Data

US 2021/0178892 A1 Jun. 17, 2021

(51) Int. Cl.
*B60K 1/00* (2006.01)
*B60K 7/00* (2006.01)
*B60K 1/02* (2006.01)
*F16D 1/10* (2006.01)

(52) U.S. Cl.
CPC .............. *B60K 7/0007* (2013.01); *B60K 1/02* (2013.01); *B60K 2007/0038* (2013.01); *F16D 1/10* (2013.01); *F16D 2001/103* (2013.01)

(58) Field of Classification Search
CPC ........ B60K 7/0007; B60K 1/02; B60K 6/442; B60K 23/04
See application file for complete search history.

(56) References Cited

U.S. PATENT DOCUMENTS

| | | | | |
|---|---|---|---|---|
| 8,529,401 | B2 * | 9/2013 | Arakawa | B60L 50/16 477/8 |
| 8,641,568 | B2 * | 2/2014 | Knoblauch | B60K 6/442 475/150 |
| 8,960,341 | B2 * | 2/2015 | Weber | H02K 7/006 180/65.7 |
| 9,154,060 | B2 * | 10/2015 | Noguchi | B60K 6/448 |
| 9,866,088 | B1 * | 1/2018 | Hauser | H02K 16/02 |
| 10,065,645 | B2 * | 9/2018 | Zou | B60W 30/18 |
| 10,179,507 | B2 * | 1/2019 | Terayama | B60L 15/2036 |
| 10,611,260 | B2 * | 4/2020 | Nasu | B60L 15/2054 |
| 2006/0037792 | A1 * | 2/2006 | Boss | B60K 7/0007 180/65.6 |
| 2006/0199697 | A1 * | 9/2006 | Kirkwood | B60K 23/04 477/5 |

(Continued)

FOREIGN PATENT DOCUMENTS

CN 103595177 A 2/2014
CN 110154723 A 8/2019

(Continued)

*Primary Examiner* — Hau V Phan
(74) *Attorney, Agent, or Firm* — Rutan & Tucker LLP; Hani Z. Sayed

(57) ABSTRACT

A system for selectively locking two coaxial axle shafts of an electric axle is provided. The system includes a first electric motor having a first rotor shaft configured to drive a first axle shaft. The system also includes a second electric motor having a second rotor shaft configured to drive a second axle shaft coaxial with the first axle shaft. An actuator is configured to selectively activate to operate in a safety mode. When operated to assume the safety mode, the actuator causes the first rotor shaft to lock to the second rotor shaft, such that the two shafts rotate in unison. This allows one of the two motors to drive both axle shafts in the event of a fault in one of the motors.

16 Claims, 2 Drawing Sheets

(56) References Cited

U.S. PATENT DOCUMENTS

| | | | | |
|---|---|---|---|---|
| 2010/0025131 A1* | 2/2010 | Gloceri | ................. | B62D 21/11 |
| | | | | 180/65.28 |
| 2013/0030636 A1* | 1/2013 | Sugata | ..................... | B60L 3/04 |
| | | | | 701/22 |
| 2018/0297629 A1 | 10/2018 | Wang et al. | | |

FOREIGN PATENT DOCUMENTS

| | | |
|---|---|---|
| JP | 2004120961 A | 4/2004 |
| JP | 2014065383 A | 4/2014 |

\* cited by examiner

DUAL MOTOR COAXIAL E-AXLE WITH ROTOR SHAFT LOCKING MECHANISM

TECHNICAL FIELD

The present disclosure relates to an electric axle assembly for a vehicle, having two electric motors, with each motor capable of individually driving a respective axle shaft.

BACKGROUND

Electric axle ("e-axle") assemblies may include an electric motor configured to drive or propel an axle. Hybrid vehicles and electric vehicles may include an e-axle assembly with an electric motor to propel both wheels of a common axis. Dual-motor coaxial e-axles may include a first motor configured to propel the wheel of a first half-shaft, and a second motor configured to propel the wheel of a second half-shaft coaxial with the first half-shaft. In other words, along one common axle, one motor can propel one wheel while another motor independently propels the other wheel.

SUMMARY

In one embodiment, an electric axle assembly includes a first electric motor located about an axis and configured to provide drive power to a first axle shaft; a second electric motor located about the axis and configured to provide drive power to a second axle shaft coaxial with the first axle shaft; and a locking assembly configured to selectively lock the first electric motor to the second electric motor to rotate in unison such that the first electric motor can provide drive power to the first axle shaft and the second axle shaft.

In another embodiment, an electric axle assembly includes a first electric motor including a first rotor configured to rotate a first rotor shaft, and configured to provide drive power to a first axle shaft; a second electric motor including a second rotor configured to rotate a second rotor shaft, and configured to provide drive power to a second axle shaft, coaxial with the first axle shaft; and a locking assembly configured to translate linearly between (i) a first position in which the first rotor shaft is able to rotate relative to the second rotor shaft, and (ii) a second position in which the first rotor shaft is non-rotatably coupled to the second rotor shaft such that the first electric motor can provide drive power to the first axle shaft and the second axle shaft.

In yet another embodiment, a system for selectively locking two coaxial axle shafts of an electric axle includes a first electric motor having a first rotor shaft configured to drive a first axle shaft; a second electric motor having a second rotor shaft configured to drive a second axle shaft coaxial with the first axle shaft; and an actuator configured to, when operated during a safety mode, lock the first rotor shaft to the second rotor shaft such that the first electric motor can drive the first and second axle shafts.

DETAILED DESCRIPTION

Figure 1:
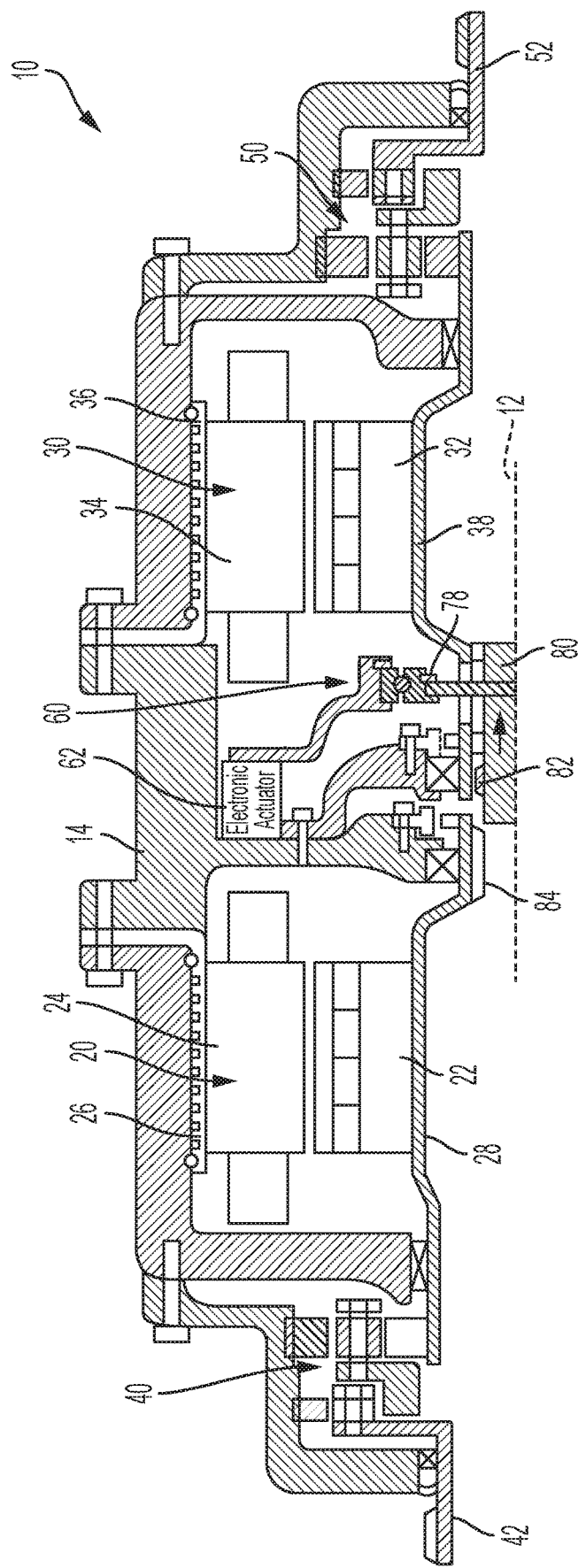
FIG. 1 is a cross-section of an electric axle assembly according to one embodiment with a locking assembly operating in a first mode of operation.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure is not limited to the specific embodiments and methods described below, as specific components and/or conditions may, of course, vary. Furthermore, the terminology used herein is used only for the purpose of describing embodiments of this disclosure and is not intended to be limiting in any way unless noted.

As used in the specification and the appended claims, the singular form "a," "an," and "the" comprise plural referents unless the context clearly indicates otherwise. Reference to a component in the singular is intended to comprise a plurality of components, unless the context clearly indicates otherwise.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

As used herein, the terms "drive" or "power" when referring to electric motors is intended to mean actively providing driving power to a particular component to rotate an individual wheel associated with that component. For example, if an electric motor that has a rotor shaft that rotates an associated axle shaft for rotating a wheel on that axle shaft, it can be said that the electric motor "drives" or "powers" that wheel or that axle shaft. A second axle shaft may be rotated as a result of driving power from a second motor, and therefore it can be said that the second motor, not the first motor, drives that second axle shaft. If, for example, a mechanical lock is made such that one of the motors now provides active propelling force to both first and second axle shafts (as opposed to only one of the axle shafts), then it can be said that the motor now drives both axle shafts.

E-axle assemblies may include an electric motor configured to drive or propel an axle. Hybrid vehicles and electric vehicles may include an electric axle assembly with an electric motor to propel the axle shafts of one vehicle axle. Dual motor coaxial e-axles may include a first motor configured to propel the wheel of a first half-shaft, and a second motor configured to propel the wheel of a second half-shaft coaxial with the first half-shaft. In other words, along one common axle, one motor can propel one wheel while another motor propels the other wheel.

In certain coaxial e-axle embodiments, each wheel of a single axle (e.g., front axle or rear axle) is driven independently by a separate respective electric motor. If one of the motors loses the ability to power its respective wheel, there may be a potential that the vehicle could drive poorly due to all of the torque going to one wheel on the axle.

Therefore, according to embodiments disclosed herein, a coaxial e-axle is provided with the ability to mechanically lock or couple the two half-shafts that are otherwise independently driven by respective motors. If one of the motors loses its ability to power its respective wheel, a locking assembly can be actuated to mechanically couple the still-working motor to both half-shafts. This gives the vehicle the ability to "limp home" safely until repairs can be made. Torque can be provided to both wheels, being powered by only one of the two motors on the e-axle.

Figure 3:
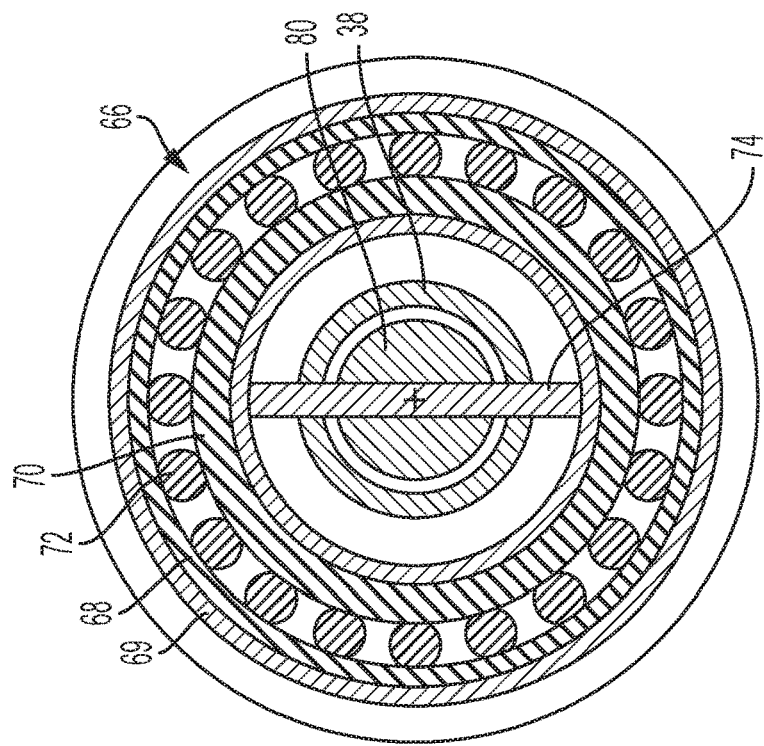
FIG. 3 is a cross-sectional view of the locking assembly, according to an embodiment.
Figure 2:
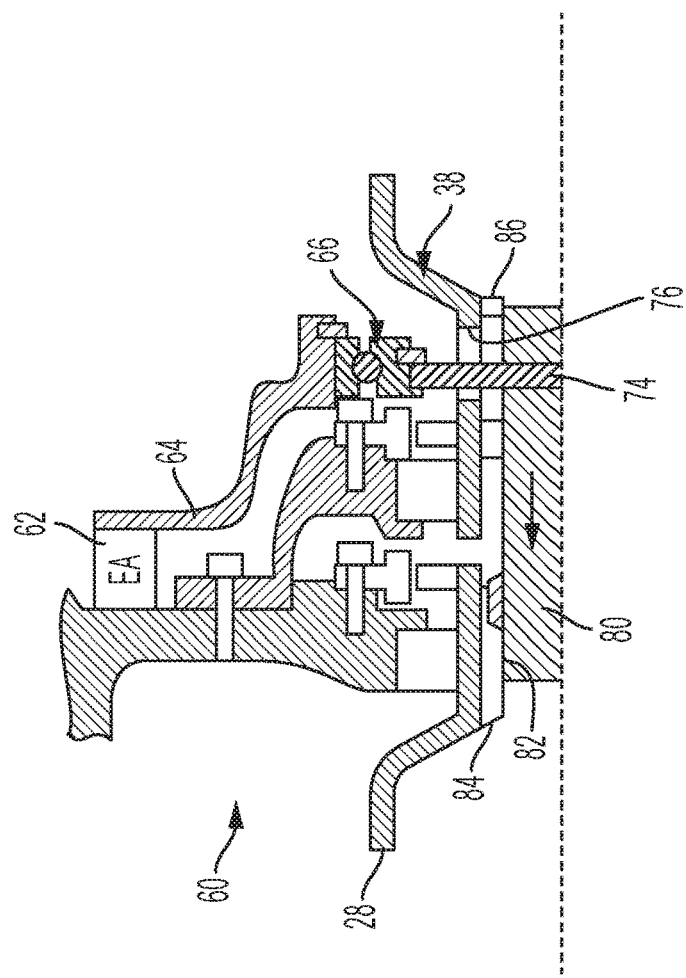
FIG. 2 is an enlarged view of a portion of the electric axle assembly of FIG. 1, with a locking assembly operating in a second mode of operation.

FIG. 1 is a cross-section of an e-axle assembly 10 according to one embodiment. In FIG. 1, the e-axle assembly 10 is operating under normal conditions, with each respective axle half-shaft being powered by a respective one of two motors. FIG. 2 is an enlarged view of a portion of the e-axle assembly operating in a safety mode, or a "limp home" mode according to one embodiment. In this view, a locking assembly is actuated to mechanically couple the rotor from one motor to the rotor of the other motor of the e-axle, allowing one of the two motors to power both axle half-shafts. FIG. 3 is a cross-sectional view of the locking assembly, according to an embodiment.

Referring to FIGS. 1-3, the e-axle assembly 10 includes a first motor 20, and a second motor 30 coaxial with the first motor 20 about a common axis 12. The motors may be permanent magnet motors, induction motors, or the like. The motors 20, 30 are also located within a housing 14. The housing 14 may be a single housing member extending over both motors 20, 30. Or, as illustrated in FIG. 1, the housing 14 can be five separate housing members fastened together. More or less than five housing members can be utilized. One or more housing members are hereinafter collectively referred to as a "housing".

In the illustrated embodiment, the first motor 20 has a first rotor 22 that is configured to rotate relative to a first stator 24. The first stator 24 may be provided with metal (e.g., copper) windings. When an electric current is provided from an electric power source (such as a battery, not shown), a magnetic field is produced, causing rotation of the first rotor 22 within the first stator 24. A first water jacket 26 may be provided for cooling of the stator 24 during operation. The second motor 30 includes similar or identical structure, such as a second rotor 32, a second stator 34 about the second rotor 32, and a second water jacket 36.

The first rotor 22 of the first motor 20 is connected (e.g., non-rotatably fixed) to a first rotor shaft 28. Likewise, the second rotor 32 of the second motor 30 is connected to a second rotor shaft 38. As the rotors 22, 32 rotate about the axis 12, the connected rotor shafts 28, 38 also rotate about the axis 12. During normal operation, each motor 20, 30 can be independently controlled and powered so that the first and second rotor shafts 28, 38 can rotate independent of one another. This allows torque to be transmitted to wheels (not shown) independently.

The first rotor shaft 28 is also connected to a gearset, such as a first planetary gearset 40. The planetary gearset 40 is also connected to a half-shaft, also referred to as a first axle shaft 42. The planetary gearset 40 converts rotational movement of the first rotor shaft 28 into rotational movement of the first axle shaft 42 about the axis 12. The planetary gearset 40 can be configured to decrease the rotational speed transmitting therethrough, such that the first axle shaft 42 may rotate about the axis 12 at a slower speed than the driving first rotor shaft 28. The first axle shaft 42 is connected to a first wheel (not shown) to rotate that wheel. The second rotor shaft 38 is likewise connected to a gearset, such as a second planetary gearset 50 which is similarly coupled to a second axle shaft 52 for rotating a second wheel.

The e-axle assembly 10 includes a locking assembly 60. As will be described below according to an embodiment, the locking assembly 60 is configured to mechanically couple the first motor 20 with the second motor 30. In particular, the locking assembly 60 is configured to selectively mechanically couple the first rotor shaft 28 with the second rotor shaft 38 so that the rotor shafts 28, 38 rotate in unison. In the event that one of the motors 20, 30 loses its ability to properly power its respective wheel, the locking assembly 60 can engage such that both rotor shafts 28, 38 rotate together, allowing one of the motors 20, 30 to actively power both axle shafts 42, 52, and therefore power both wheels.

According to an embodiment, the locking assembly 60 includes an actuator 62. The actuator may be a linear actuator, capable of moving linearly such as in a direction parallel to the axis 12. The actuator 62 may be a hydraulic, electronic, or pneumatic actuator capable of moving a connected component linearly in a direction parallel to the axis 12. The actuator 62 is fixed relative to the housing 14, such that it does not rotate about the axis 12.

The actuator 62 is coupled to an arm 64. The arm 64 extends radially inward from the actuator 62 toward the axis 12. The arm 64 receives an actuating force from the actuator 62 and is likewise transitioned linearly in a direction parallel to the axis 12. In one embodiment, the arm 64 extends annularly about the axis 12.

The arm 64 is coupled to a bearing 66. The bearing 66 includes an outer race 68 that is non-rotatably fixed to the arm 64. A snap ring 69 may be provided to engage and affix the outer race 68 to the arm 64. The bearing 66 also includes an inner race 70. A plurality of rolling elements 72 (e.g., balls) are arranged annularly about the axis 12, and radially between the outer race 68 and the inner race 70. The rolling elements 72 enable relative rotation between the outer race 68 and the inner race 70. A locker pin 74 is non-rotatably coupled to the inner race 70. This allows relative rotation between the locker pin 74 and the arm 64. In application, the locker pin 74 may rotate while the arm 64 remains non-rotational. This may occur when, for example, the locking assembly 60 is actuated to lock the first rotor shaft 28 with the second rotor shaft 38, such that the locker pin 74 rotates as both connected rotor shafts 28, 38 rotate. The locker pin 74 extends radially inward from the inner race 70, through an aperture 76 in the second rotor shaft 38. A snap ring 78 may be provided to engage and affix the inner race 70 to the locker pin 74.

The arm 64, the bearing 66, and the locker pin 74 are all axially moveable together as the actuator 62 is actuated. In other words, when the actuator 62 is commanded to move linearly, this causes the arm 64, the bearing 66, and the locker pin 74 to also move linearly.

The locking assembly 60 also includes a locker shaft 80. The locker shaft 80 provides the physical link between the first rotor shaft 28 and the second rotor shaft 38 as the locking assembly is actuated to enable one motor to power both wheels. In particular, the locker shaft 80 is rotatably coupled to (i.e., can rotate relative to) the locker pin 74, and also translates linearly along the axis 12 with the locker pin 74. Meanwhile, the locker shaft 80 may be non-rotatably coupled to (i.e., may rotate in unison with) the second rotor shaft 38 via a bushing or sleeve 81 disposed radially between the locker shaft 80 and the second rotor shaft 38. The locker shaft 80 has an outer surface with surface features 82, such as grooves, teeth, splines, or the like. The first rotor shaft 28 has corresponding surface features 84 on an inner surface thereof. The surface features 82, 84 can selectively engage one another to non-rotatably couple the locker shaft 80 with the first rotor shaft 28. This can be accomplished via spline connection, for example. The locker shaft 80 is linearly translatable along or within a bushing or sleeve 86 located radially between the locker shaft 80 and the second rotor shaft 38 to enable relative axial movement therebetween.

FIG. 1 shows the locking assembly 60 in a first position during normal operation. The locker shaft 80 is disposed in a first axial location (e.g., to the right in this view). In this position, the locker shaft 80 is not in contact with the first rotor shaft 28. In other words, the surface features 82, 84 are not engaged. This allows the first motor 20 to power the first axle shaft 42, while the second motor 30 can independently power the second axle shaft 52.

In response to fault or other type of inability of one of the motors 20, 30 to properly power its respective axle shaft 42, 52, the actuator 62 may be commanded by a controller (not shown) to actuate to assume a second position during a safety mode. During actuation, electronics or hydraulics or pneumatics are activated to move the actuator linearly. This causes the arm 64 to move linearly (e.g., to the left in this view), causing the connected locker pin 74 to move linearly through the aperture 76 in the second rotor shaft 38. The locker shaft 80 is moved linearly along with the locker pin 74, and engagement is made between the surface features 82 of the locker shat and the surface features 84 of the first rotor shaft 28. With engagement between the locker shaft 80 and the first rotor shaft 28, the first rotor shaft 28 now rotates in unison with the locker shaft 80 and the second rotor shaft 38. This allows one of the motors 20, 30 to power both axle shafts 42, 52, which may otherwise be impossible during the normal operation. In this mode of operation, if one motor has a fault, the vehicle is able to "limp home" with power and torque distribution to the wheels that may be unacceptable during normal operation, but nonetheless allow the vehicle to drive to safety where proper maintenance can be performed.

The actuator 62 above is described as being controlled by a controller. The controller may be integral with the actuator, or may be external to the actuator. The controller can be any suitable controller for receiving information from one or more sensors indicative of a fault or failure or proper operation of one of the motors 20, 30, and correspondingly controlling the actuator 62 to move linearly. In this disclosure, the terms "controller" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause the controller to command movement of the actuator 62 in a linear direction to selectively engage or disengage the first rotor shaft 28 with the locker shaft 80.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 electric axle ("e-axle") assembly
12 axis
14 housing
20 first motor 22 first rotor
24 first stator
26 first water jacket
28 first rotor shaft
30 second motor
32 second rotor
34 second stator
36 second water jacket
38 second rotor shaft
40 planetary gearset
42 first axle shaft
50 planetary gearset
52 second axle shaft
60 locking assembly
62 actuator
64 arm
66 bearing
68 outer race
69 snap ring
70 inner race
72 rolling elements
74 locker pin
76 aperture
80 locker shaft
82 surface features of locker shaft
84 surface features of first rotor shaft
86 bushing or sleeve

What is claimed is:

1. An electric axle assembly comprising:
a first electric motor located about a central axis and configured to provide drive power to a first axle shaft, wherein the first electric motor includes a first rotor configured to rotate a first rotor shaft;
a second electric motor located about the central axis and configured to provide drive power to a second axle shaft coaxial with the first axle shaft, wherein the second electric motor includes a second rotor configured to rotate a second rotor shaft; and
a locking assembly configured to selectively lock the first electric motor to the second electric motor to rotate in unison such that the first electric motor can provide drive power to the first axle shaft and the second axle shaft, wherein the locking assembly is configured to mechanically lock the first rotor shaft to the second rotor shaft, and wherein the locking assembly includes a locker shaft configured to translate linearly along the axis.

2. The electric axle assembly of claim 1, wherein the locking assembly further includes a linear actuator including a locker pin extending into the locker shaft and configured to translate the locker shaft linearly along the central axis.

3. The electric axle assembly of claim 2, wherein the locker pin extends through the second rotor shaft.

4. The electric axle assembly of claim 1, wherein:
the locker shaft includes an outer surface with first surface features, and the first rotor shaft includes an inner surface with second surface features configured to engage the first surface features as the locker shaft is translated linearly along the central axis.

5. The electric axle assembly of claim 4, wherein the first and second surface features selectively engage in a spline connection.

6. The electric axle assembly of claim 1, further comprising a bushing located radially between and contacting the second rotor shaft and the locker shaft.

7. The electric axle assembly of claim 1, wherein the locker shaft is non-rotatably fixed to the second rotor shaft and selectively non-rotatably fixed to the first rotor shaft.

8. An electric axle assembly comprising:
a first electric motor including a first rotor configured to rotate a first rotor shaft, and configured to provide drive power to a first axle shaft;
a second electric motor including a second rotor configured to rotate a second rotor shaft, and configured to provide drive power to a second axle shaft coaxial with the first axle shaft; and
a locking assembly configured to translate linearly between (i) a first position in which the first rotor shaft is able to rotate relative to the second rotor shaft, and (ii) a second position in which the first rotor shaft is non-rotatably coupled to the second rotor shaft such that the first electric motor can provide drive power to the first axle shaft and the second axle shaft, wherein the locking assembly includes a linear actuator configured to move a locker shaft linearly.

9. The electric axle assembly of claim 8, wherein the locker shaft is disposed radially inward of the first and second rotor shafts.

10. The electric axle assembly of claim 8, wherein:
when the locking assembly is in the first position, the locker shaft is engaged with the second rotor shaft but not the first rotor shaft, and
when the locking assembly is in the second position, the locker shaft is engaged with the first and second rotor shaft.

11. The electric axle assembly of claim 10, wherein the locker shaft includes an outer surface that selectively engages with an inner surface of the first rotor shaft via a spline connection.

12. The electric axle assembly of claim 8, wherein the locking assembly further includes a locker pin extending through an aperture in the second rotor shaft and rigidly fixed to the locker shaft.

13. The electric axle assembly of claim 12, wherein the aperture is sized larger than the locker pin to allow axial movement of the locker shaft.

14. A system for selectively locking two coaxial axle shafts of an electric axle, the system comprising:
a first electric motor having a first rotor shaft configured to drive a first axle shaft;
a second electric motor having a second rotor shaft configured to drive a second axle shaft coaxial with the first axle shaft;
an actuator configured to, when operated during a safety mode, lock the first rotor shaft to the second rotor shaft such that the first electric motor can drive the first and second axle shafts; and
a locker shaft configured to translate axially in response to an actuation force from the actuator.

15. The system of claim 14, wherein the locker shaft includes an outer surface that engages with an inner surface of the first rotor shaft when the actuator is operated during the safety mode to lock the first rotor shaft to the second rotor shaft.

16. The system of claim 14, further comprising:
an arm extending radially inward from the actuator;
a bearing having an outer race fixed to the arm, and an inner race rotatable relative to the outer race; and
a locker pin extending inwardly from the inner race, through the second rotor shaft, and fixed to the locker shaft.

* * * * *